MAGNETIC RECORDER WITH AUTOMATIC TIME DELAY BETWEEN REVERSALS OF RECORD TRANSPORT SYSTEM

Filed Jan. 31, 1946 4 Sheets-Sheet 1

INVENTOR.
Thomas E. Lynch
BY Pirelles & Greene
Attorneys for Applicant

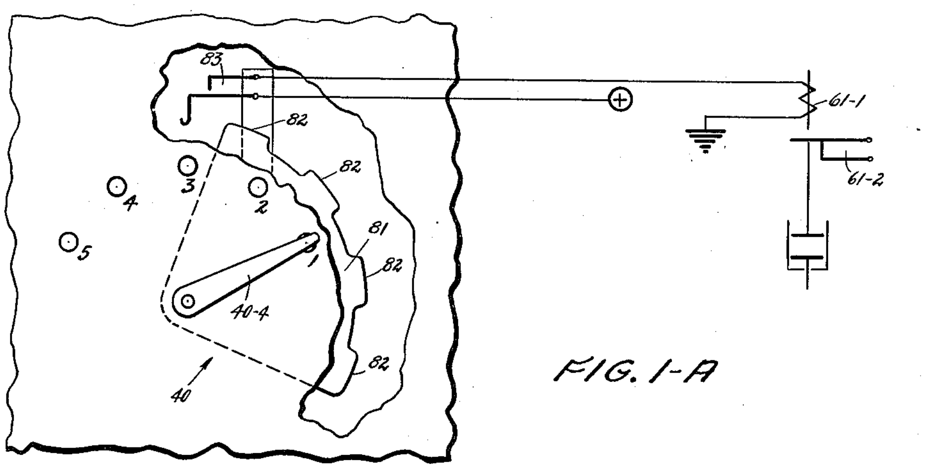
FIG. 1-A
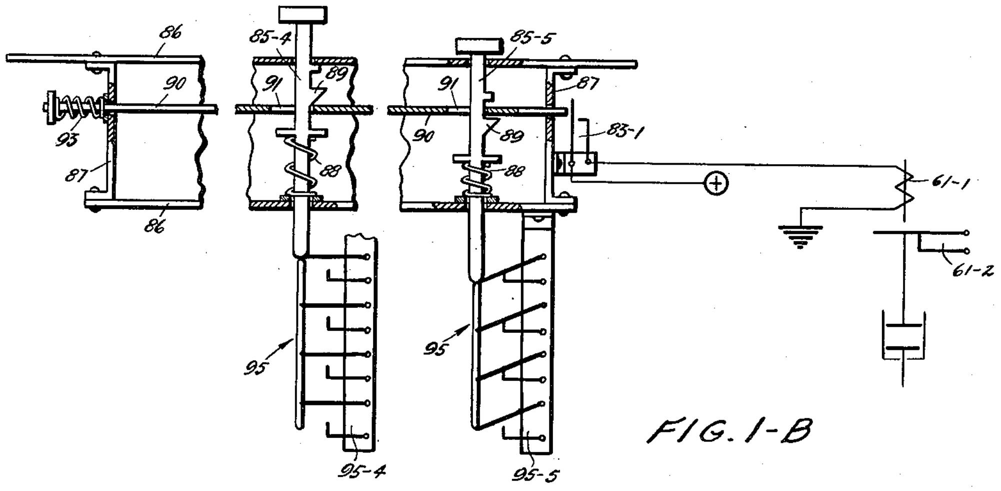
FIG. 1-B
INVENTOR.
Thomas E. Lynch
BY Pirlee & Greene
Attorneys for Applicant FIG. 1-C
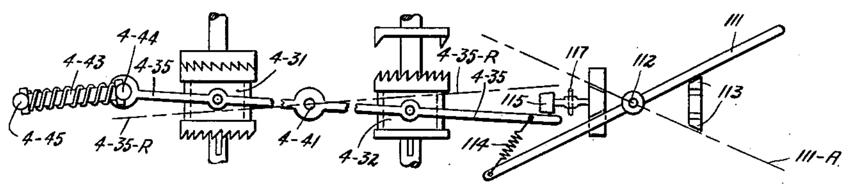
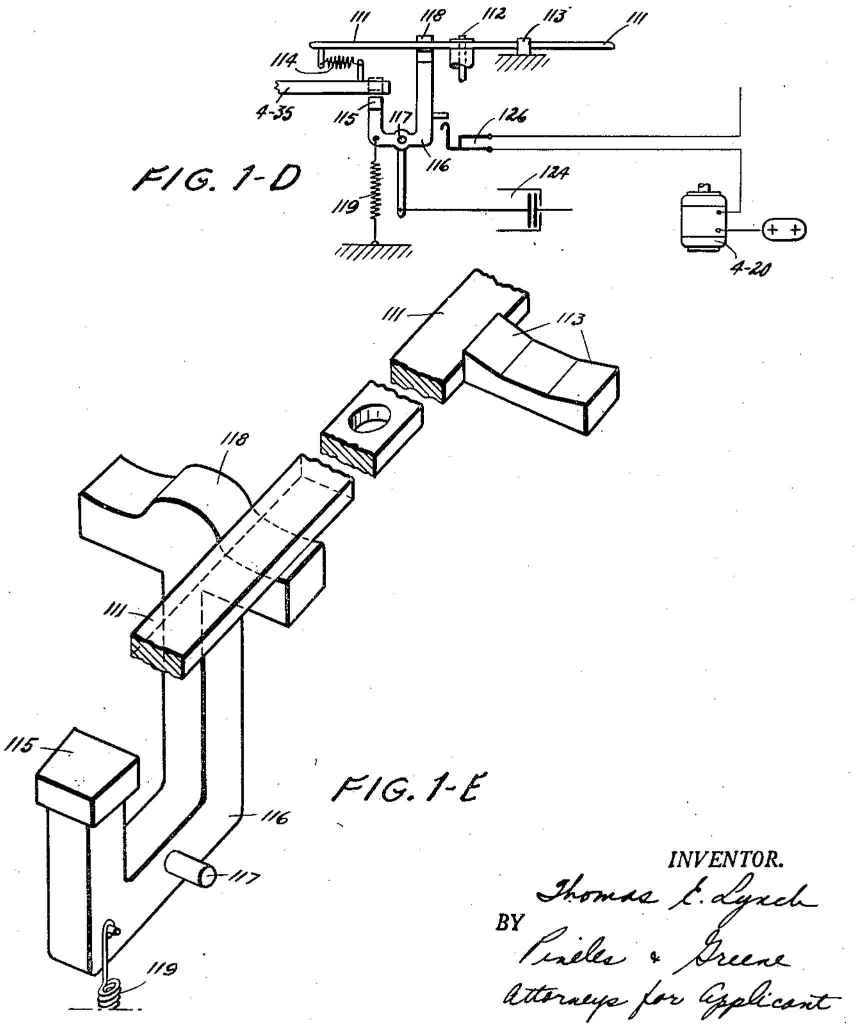
FIG. 1-D, FIG. 1-E
INVENTOR.
Thomas E. Lynch
BY
Pirlles & Greene
Attorneys for Applicant

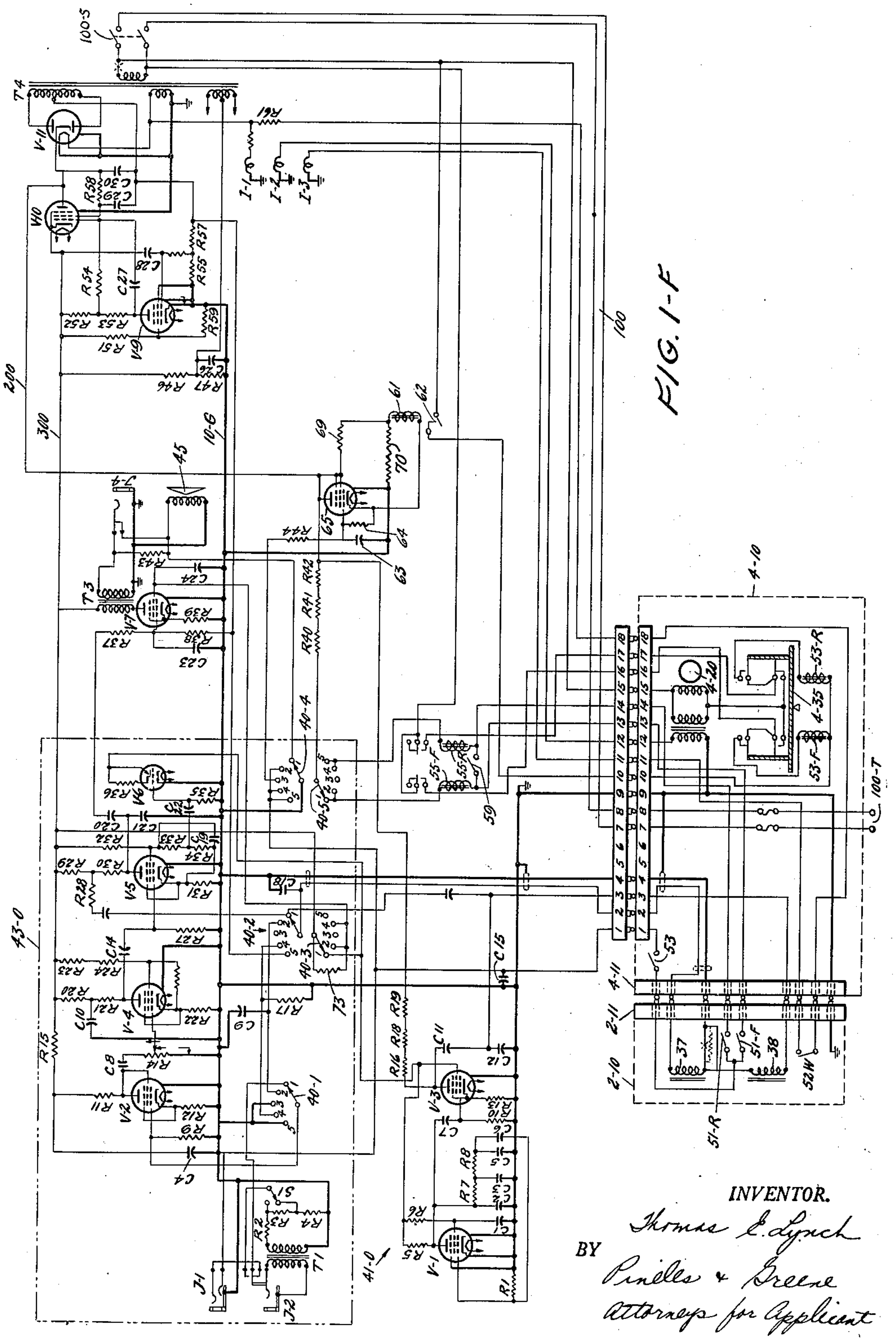
FIG. 1-F
INVENTOR.
Thomas E. Lynch
BY
Pinello & Greene
Attorneys for Applicant Patented Nov. 6, 1951

2,574,218

UNITED STATES PATENT OFFICE 2,574,218

MAGNETIC RECORDER WITH AUTOMATIC TIME DELAY BETWEEN REVERSALS OF RECORD TRANSPORT SYSTEM

Thomas E. Lynch, Cleveland, Ohio, assignor to The Brush Development Company, Cleveland, Ohio, a corporation of Ohio Application January 31, 1946, Serial No. 644,598

1 Claim. (Cl. 179—100.2)

Figure 1:
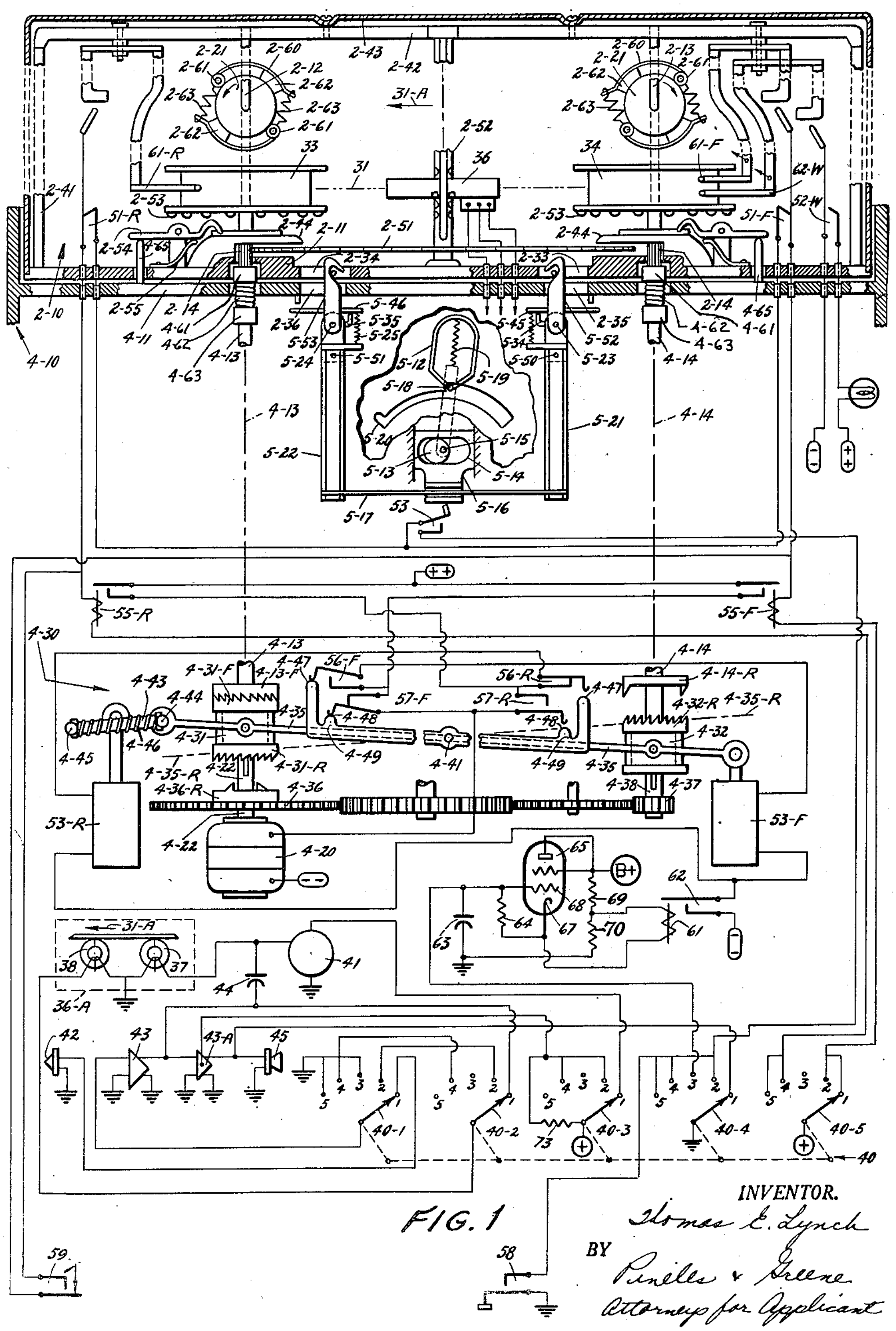

This invention relates to magnetic recording and reproducing apparatus, and more particularly to such apparatus utilizing as a magnetic recording medium a thin flexible magnetic record member, such as a wire filament or tape, which may be stored on reels for carrying on magnetic recording and reproducing operations, although some of the features of the invention are of broader scope.

Among the objects of the invention are novel magnetic recording devices of the foregoing type embodying various novel features which render them fool-proof and simple in operation; which eliminate difficulties heretofore encountered with such devices, and which improve their performance.

The foregoing and other objects of the invention will be best understood from the following description of exemplifications thereof reference being had to the accompanying drawings wherein Fig. 1 is a simplified diagrammatic view illustrating the general relationship of the mechanical, magnetic and electric elements of a magnetic recording and reproducing apparatus exemplifying the invention;

Fig. 1-A is a diagrammatic view similar to Fig. 1 of a modified form of drive control arrangement based on the principles of the invention;

Fig. 1-B is a diagrammatic view similar to Fig. 1-A of another drive control arrangement exemplifying the invention;

Figs. 1-C and 1-D are generally diagrammatic side and plan views of a modified form of drive control arrangement for a magnetic recorder of the type shown in Fig. 1;

Fig. 1-E is a perspective view of some of the elements of the control arrangement shown in Figs. 1-C and 1-D; and Fig. 1-F is an electric circuit diagram showing the electric circuit connections of all the elements of a practical form of a recorder of the type described diagrammatically in connection with Fig. 1.

Fig. 1 illustrates in a simplified diagrammatic manner the general relationship of the mechanical, magnetic and electric elements of a magnetic recording and reproducing apparatus exemplifying the principles of the invention. A magnetic recording medium in the form of a thin flexible magnetic record member, such as a magnetic record wire, filament or wire-like tape, indicated by a dash-double-dot line 31, is arranged to be reeled on take-up reel 33 from supply reel 34, which are shown driven by a drive mechanism, including a drive shaft 4—13 and a drive shaft 4—14, to which the two reels 33, 34, respectively, are coupled.

In the specific arrangement as seen in Fig. 1, magnetic recording and reproducing operations are carried on when the recording medium 31 is impelled in the forward direction indicated by arrow 31-A by driving and rotating reel 33 in counterclockwise direction. In order to play back the recorded program or to make a new record on the recording medium 31, it must be rewound on the supply reel 34 which is then driven and rotated in clockwise direction, as seen in Fig. 1, the directions in which the two reels are driven being indicated by arrows applied to the schematically indicated brake drums 2—21 associated with the two reels 33, 34, respectively.

In moving from one reel toward the other, the recording medium 31 is guided through a magnetic record transducer head structure 36 which operates to magnetically record, play back as well as erase the signals recorded on the recording medium 31. In the particular arrangement shown, the transducer head is also utilized for level winding the recording medium on the reel on which it is reeled. The transducer head structure 36 is not part of the invention and may be of the type described in the copending Begun application Serial No. 550,570, filed August 22, 1944, now abandoned, and its continuation-in-part application Serial No. 688,738, filed August 6, 1946, issued July 4, 1950, as Patent No. 2,513,617, both assigned to The Brush Development Company.

In order to simplify the description of the circuits by means of which the recording, playback and erasing operations are performed, the elements of the transducer head structure 36 are also indicated in the circuit diagram of Fig. 1 by a dash-line rectangle 36-A, and is there shown provided with an erasing head 37 and a record transducing head 38. Each of the heads 37, 38 is shown provided with windings and a magnetic core structure which has pole pieces separated by a non-magnetic gap past which the recording medium 31 is moving in the direction of the arrow 31-A. The recording medium 31 is guided through the transducer head structure so that during the recording operation each element of the recording medium passes successively first past the gap region of the erasing head 37 and then past the gap region of the record transducing head 38.

The recording system shown in Fig. 1 is arranged to carry on magnetic recording and reproducing operations under the control of a multi-blade selector switch generally designated 40 which is shown provided with a plurality of contactor blades 40—1, 40—2, 40—3, 40—4, 40—5, which are moved as a unit to one of a plurality of different contact positions, the numerals 1 to 5 applied to some of the contact positions indicating the different contact positions of the selector switch 40. Contact blades 40—1 to 40—3 of the selector switch 40 establish the recording circuits when the contact blades are in position 1 and they establish the playback circuits when the contact blades are in position 2.

When the selector switch is in the recording position 1, its contact blade 40—3 connects a source of high frequency oscillations or an oscillator 41 to a source of positive power supply indicated by a plus (+) sign, which is connected to the contact blade 40—3, the circuit as well as other analogous circuits described hereinafter being completed by the ground connections shown, to which is also connected the negative terminals of all D. C. supply sources.

The high frequency erasing current supplied by the oscillator 41 to the erasing head 37 is of sufficiently large amplitude so that each longitudinal element of the thin moving magnetic recording medium 31, passing the gap region of the erasing head 37, is subjected to an alternating flux strong enough to erase any previous magnetic signal records of the moving medium and restore the magnetic elements thereof to a magnetically neutral condition. After being subjected to the magnetic erasing action by the erasing head 37, each element of the moving recording medium 31, upon reaching the gap region of the record transducing head 38, is subjected to a magnetic recording flux produced by the amplified signal currents which are to be recorded and a superimposed high frequency biasing flux component.

In Fig. 1, a conventionally shown microphone 42 serves as a source of the signals which are to be recorded and a reproducing device, such as a loudspeaker 45 serves to reproduce the signals. During a recording operation, the microphone is connected by way of contact blade 40—1 to the input side of an amplifier 43, the output of which is supplied by way of contact blade 40—2 of the selector switch to the windings of the recording head 38 which records the signals, the circuits being completed by the ground connections shown.

The high frequency bias component of the recording flux is supplied by a high frequency current component derived from the oscillator 41 by a circuit, such as shown, which includes an adjustable coupling condenser 44 for supplying an adjustable component of the high frequency oscillations to the output circuit of the amplifier 43 where it is mixed with the amplified signal currents supplied by the microphone 42 and amplified by amplifier 43 and supplied thereby through its output circuit to the windings of the transducer head 38 which records the signals. The coupling condenser 44 and the other circuit elements of the system are designed to mix a suitable component of the high frequency oscillations derived from the oscillator 41 with the amplified signal current supplied by the microphone in such manner as to produce in the gap region of the recording head 38 the desired combination of the signal recording flux and the superimposed high frequency biasing flux component.

In general, when recording signals of the audible frequency range, good results are obtained by using a high frequency biasing flux of about 25 kilocycles per second and the same source of high frequency signals may be used for supplying a relatively large high frequency erasing current to the erasing head 37 as well as the small high frequency biasing component to the recording head 38.

To play back the magnetically recorded signals while the recording medium is moving in the same direction as during the recording process, the selector switch 40 is actuated to the playback position 2. When the selector switch is in the playback position 2, its contact blade 40—3 disconnects the oscillator 41 from the source of power supply, thereby de-energizing the oscillator, and no high frequency erasing or biasing currents are supplied to the erasing head 37 and the transducer head 38. Furthermore, selector contact blades 40—1, 40—2 now connect the windings of the record transducer head 38, which operates now as a playback head, to the input side of the amplifier 43, the output of which is now supplied after amplification in an additional amplifier stage 43-A to the reproducing device 45 for reproducing the signals.

In the magnetic recording device shown in Fig. 1, the two reels 33, 34 with the recording medium stored thereon form part of a self-supporting detachable guide unit 2—10 designed for detachable interconnection with a motor or drive unit 4—10. The drive unit 4—10 is shown in the form of a casing in which are housed all the elements of the driving mechanism as well as the amplifier and the principal control elements of the device, and supplies the mechanical power required for reeling the magnetic recording medium from one reel to the other.

The drive mechanism of the drive unit 4—10 has a drive motor 4—20 which may be provided with a built-in speed reducing mechanism so as to drive a motor drive shaft 4—22 at a speed at which it may be directly coupled to the drive shaft 4—13 of the take-up reel 33 for driving it at the speed proper for carrying on recording or reproducing operations. The driving mechanism of the recording device shown is so designed as to assure that when one of the reels 33, 34 is driven for reeling thereon the recording medium, the other reel will at all times be subjected to a braking action sufficient to maintain the recording medium under tension, and that when the direction of the motion of the recording medium is reversed, the removal of the driving forces from one reel and the application to the other reel is controlled in a predetermind time sequence to assure that the two reels and the moving recording medium are first brought to a positive stop before the driving forces are applied to the other reel. The selective application of the driving forces to each reel is interlocked and subjected to the control of time action means so that whenever the application of the driving forces is reversed, the reel mechanism is first brought to a positive stop before the driving forces are applied to the other reel.

In the arrangement shown, the drive control mchanism includes coupling means, generally designated 4—30, for selectively coupling the motor drive shaft 4—22 either directly to reel drive shaft 4—13 or through a speed step-up mechanism to the other reel drive shaft 4—14 for driving the supply reel 34 in counterclockwise direction at an increased speed during the rewinding operation.

In the arrangement shown, the coupling means comprise slidably mounted coupling members 4—31, 4—32 which are operated by a coupling lever 4—35 from the position shown in which coupling member 4—31 establishes a direct coupling connection between the motor drive shaft 4—22 and the reel drive shaft 4—13 of the take-up reel 33 for rotating it in forward direction—or to the opposite coupling position indicated by dash-dot lines 4—35–R—in which coupling member 4—31 breaks the coupling connection from the motor drive shaft 4—22 to the drive shaft 4—13 of the take-up reel, and instead couples the motor drive shaft 4—22 to gear 4—36 of a train of step-up gears including gear 4—37, while the other coupling member 4—32, which is now in reverse coupling condition, couples the gear 4—37 to the rewind drive shaft 4—14 for rotating the supply reel at a higher speed in clockwise direction.

As shown in Fig. 1 the coupling member 4—31 is slidably keyed on an extension of the motor drive shaft 4—22 and is provided with a coupling disc 4—31–F having a peripheral row of one-way coupling teeth which establish coupling engagement with two complementary teeth of coupling disc 4—13–F affixed to the reel drive shaft 4—13, when the coupling lever 4—35 is in the forward drive position shown. When the coupling member 4—31 is moved to the opposite rewind-drive position it breaks the coupling connection of the motor drive shaft 4—22 to the reel drive shaft 4—13 and establishes instead a coupling connection between a similar row of one-way coupling teeth of its coupling disc 4—31–R with the two complementary teeth of coupling disc 4—36–R affixed to the gear 4—36 which is revolvably mounted on the motor drive shaft 4—22. The gear 4—36 forms part of the drive-reversing and step-up gearing system including gear 4—37 affixed to gear driven shaft 4—38 which is mounted coaxially with the reel drive shaft 4—14. The other coupling member 4—32 is slidingly keyed on the gear driven shaft 4—38 and is arranged to be slidably moved by the coupling lever 4—35 from the uncoupling position shown to the coupling position in which a row of one-way coupling teeth of its coupling disc 4—32–R establishes driving coupling engagement with two complementary teeth of a coupling disc 4—14–R affixed to the reel drive shaft 4—14 for driving it during the rewinding operation in the direction opposite to the direction in which the reel drive shaft 4—13 is driven.

The control lever 4—35 is shown pivotally mounted on a fixed pivot 4—41 and one end thereof is connected through a pivot pin 4—42 to a spring-loaded toggle arm 4—43, the other end of which is pivotally held on a fixed pivot 4—45. The toggle arm 4—43 is formed of two telescopically mounted sliding toggle arm sections, the ends of which are biased apart by a compression spring 4—46 so that when the coupling lever 4—35 is moved past a center position, its toggle arm 4—43 with its compression spring 4—46 will bring the coupling lever either to the forward coupling position shown or to the opposite rewind coupling position indicated by dash line 4—35–R.

The coupling mechanism of the type described may be controlled either mechanically or electrically. In order to provide for remote control, the coupling mechanism shown is electrically controlled. In the form shown, the electrical control comprises two relay or solenoid members 53–F, 53–R held in fixed position and having core or armature members which are pivotally interconnected to moving portions of the coupling lever so that when the forward solenoid 53–F is energized, the coupling lever 4—35 will be actuated from the dotted line position 4—35–R to the full line position shown, and that when the rewind solenoid 53–R is energized, the coupling lever will be actuated to the dash-line position 4—35–R.

The drive control mechanism shown is arranged to utilize only a single time action means for assuring that whenever the drive control mechanism is actuated from either one or the other drive position to a standby position or to the opposite drive position, the time action means are actuated to make it impossible to establish the opposite drive connection until after a predetermined time action sufficient to assure that the reels have been brought to a stop before the opposite drive connection could be established, if the drive control mechanism is actuated to the opposite drive control position.

Fig. 1 illustrates in a simplified diagrammatic manner one form of such drive control arrangement. It utilizes as a time action means a single time delay relay 61, which is arranged to open its contacts 62 instantaneously upon the de-energization of the relay and to reclose with a desired time delay when the relay is energized, or, in other words, to instantaneously open a control circuit and to close the control circuit with a required time delay.

The desired time action of relay 61 is supplied by an electronically controlled circuit including a condenser 63, a resistor 64 interconnected with a circuit which is controlled in such manner that the time required for charging the condenser to a predetermined potential determines a time delay which the relay 62 recloses while assuring that the relay opens instantaneously upon the application of a proper control action to the circuit.

In the arrangement shown, an electron amplifier tube 65 having an anode as well as a cathode 67 and a control grid 68 is utilized in a novel manner for controlling the operation of the time action relay 61, and the manner in which the condenser 63 is charged and discharged in order to provide the required time action in delaying the recloser of the relay as well as to assure that the relay is instantaneously opened depending upon the control action applied to the tube circuits. In the particular time delay circuit arrangement shown, the anode as well as its screen grid of tube 65 are interconnected to operate as a single anode electrode and are connected to a source of positive supply voltage indicated by B+, one branch of the anode or plate circuit being formed by a resistance 69 and a resistance 70 serially connected between the anode of tube 65 and the conventionally shown ground to which the negative terminal of the positive supply source B+ is also connected. The time action control condenser 63 is connected between the control grid 68 of tube 65 and ground and a grid resistor 64 is connected between the control grid and the terminal of the cathode 67. The relay coil 61 is connected between the point of the interconnection of the two resistors 69 and 70 and the point of interconnection of the cathode 67 to the grid bias resistor 64 in such manner that when the condenser 63 is short circuited the current through the relay coil 61 will be instantaneously reduced to zero, and that when the short circuit connection is removed from the condenser 63, the condenser 63 shall be charged at such slow rate as to assure that the current through the relay 61 reaches a value sufficient to actuate it to the operated position only after the required time delay.

In accordance with the invention, the circuit elements of the time delay circuit arrangement shown are so chosen and designed that under equilibrium conditions when the condenser 63 is fully charged and the control grid 68 is at zero bias voltage, with respect to the cathode 67, the relatively large maximum value of the current flowing through the tube from the anode 65 to the cathode 67 and therefrom through relay coil 61 and the resistance 70 connected in series therewith to ground at a relatively large component of the voltage drop will be produced by its current across the resistors 70 which completes the energizing circuit of the relay 61 to ground. With such circuit arrangement a momentary short circuiting of the condenser 63 will instantaneously apply the very high negative potential developed across the resistor 70 to the control grid 68 of the tube, and cause it to instantaneously stop the flow of the current through the tube and the relay coil 61 and bring about instantaneous actuation of the relay to the reversal blocking condition, which in the arrangement shown corresponds to the opening of the relay contacts 62.

According to the invention, grid resistance 64 is made sufficiently large that when the short circuit of the condenser is removed the charge of the condenser 63 will build up gradually at a required slow rate which will provide the proper time delay before sufficient current flows at which the condenser 63 has restored thereto a charge which produces a current flow sufficient to energize the relay 61.

The time delay arrangement shown enables an extremely fast and fool-proof de-energization of the relay because the circuit elements of the system are so designed and chosen that when the condenser 63 is short circuited the relay coil 61 is connected across points of equal potential of two sides of a bridge connected between the terminal of the positive plate supply B+ and the ground, one side of the bridge circuit leading from the B+ supply terminal to the anode of tube 65 and therefrom through the cathode 67 by way of grid resistance 64 to the ground; the other side of the bridge leading from the B+ supply terminal through the series 69 and 70 to ground.

In the practical time delay arrangement of the type described above, very effective control action is secured by making the voltage drop across the tube 65 between the anode and the cathode 67 about 1/3 of the voltage drop across the elements formed by the relay coil 61 and the resistor 60 through which the relay energizing current flows when the condenser 63 is fully charged in its normal equilibrium condition.

In order to enable ready practice of the invention by those skilled in the art and without in any way limiting the scope thereof, there are given below data of one practical form of time delay circuit arrangement of the type described above:

Tube 65 was a 6SJ7 tube
Condenser 63 was of one mf.
Grid resistor 64 was of 680,000 ohms
Resistor 69 was of 470,000 ohms
Resistor 70 was of 78,000 ohms In the arrangement shown, the blocking potential is applied to the control grid 68 of tube 65 by the operation of the selector switch 40 which is utilized to control the recording, playback as well as the rewinding operations. Selector contact blade 40—4 applied a negative blocking potential to the control grid 68 whenever it is moved to or past position 3 from either one of its other positions 1, 2 or 4, 5. As a result, the relay opens each time the selector switch 40 is moved either from positions 1 and 2 to position 3 or from positions 5 and 4 to position 3, or from either one of positions 1 and 2 to either one of positions 4 and 5, or vice versa.

As explained above, the reversal of the driving connection to the reels or, in general, to the impelling elements which impel the recording medium, is controlled by the operation of the selector switch 40 and particularly by its set of contact blades 40—3, 40—4, 40—5. The drive control circuits also include a normally closed forward limit switch 51–F which opens whenever the limit of the forward reeling motion is reached, a normally closed rewind limit switch 51–R which opens whenever the limit of the rewinding operation is reached, a latch switch 53 which is biased to an open position and is closed only if the detachable reel holder and guide unit 2—10 is latched in its coupled position to the guide unit 4—10, and two auxiliary relays, namely, the forward relay 55–F and a rewind relay 55–R.

The drive control circuit further includes a set of switch control contacts 56–F, 57–F which are operated from their normal released position to the operative position shown when the coupling lever, or, in general, the coupling means, are actuated to establish a forward drive coupling connection and a set of similar switch contacts 56–R, 57–R which are operated from the normally biased position shown to the operative position when the coupling means are actuated to establish rewind driving connections. In the arrangement shown, the switches 56–F, 56–R control the selective energization and de-energization of the two coupling solenoids so as to de-energize the solenoid after it was energized to perform a drive reversal operation and after having performed its function in reversing the drive connection. The two other switches 57–F, 57–R control the energization of the drive motor 4—20 and operate to assure that the motor is de-energized during a drive reversal operation and to effect energization of the motor only when the drive reversing operation has reached a predetermined stage at which the energization and driving action of the motor are desirable for performing the drive reversing operation.

In particular, the two sets of switches are shown controlled by a finger plate 4—49 suitably affixed to the control lever 4—35 so as to move therewith and is provided with two sets of fingers 4—47, 4—48 for operating the two sets of coupling control switches 56–F, 57–F, 56–R, 57–R. The switches 56–F, 57–F, 56–R, 57–R as well as the similar other switches shown are of the micro-switch type which operate with a snap action when actuated by a push pin or similar actuating element. In the arrangement shown, the several switches which are operated by the control lever 4—35, or, in general, the coupling control means, are designed to operate in the following manner:

It is assumed that the drive mechanism is in the condition shown in which the coupling mechanism establishes the driving connection from the motor 4—20 to forward drive reel shaft 4—13. In the arrangement shown, the reversal of the drive connection is controlled by the selective closure of the contacts of either the forward drive relay 55–F or rewind drive relay 55–R, which also serve to control the energization of the motor. The two auxiliary relays 55–F, 55–R perform merely the auxiliary function of making it possible to separate the power line circuits which supply operating power for the motor 4—20 and the coupling solenoids 53–F, 53–R from the operating circuits which are used for remotely controlling the operation of the drive mechanism and the recording and reproducing operations from low power relay supply sources which are indicated in the diagram by the plus (+) sign and ground connection.

With the mechanism in the condition shown, when the contacts of rewind relay 55–R are closed, current will be sent from one terminal of a source of power supply indicated by a double plus (++) sign through the closed coupling interlocked contacts 56–R, and through the rewind solenoid 53–R, the energized circuit of which is completed only if the time delay relay 61 closes its contacts which connect the circuit to the positive terminal of the power supply indicated by a double minus (——) sign. The double plus (++) and double minus (——) signs are used for the sake of simplicity to indicate a conventional source of power which may be either an alternating current source or a direct current source for supplying power to the motor and to the operating elements, such as the solenoids of the coupling mechanism.

Upon energization, the rewind solenoid 53–R will start moving the coupling lever 4—35 from the coupling position shown toward the dash-dot line position 4—35–R. The two coupling interlock switches 56–R, 57–R which are operated by the control lever as it moves towards the rewind coupling position are arranged to be actuated in a predetermined sequence in order to assure that the motor energizing switch 57–R operates to energize the motor before the coupling member 4—32 has established coupling engagement with the coupling teeth of the coupling member 4—32–R through which it is coupled to the rewind drive shaft 4—14, and that the coupling interlock switch 56–R shall operate to open and de-energize the rewind solenoid 53–R after the coupling teeth of coupling elements 4—32, 4—32–R are sufficiently engaged and the coupling lever is past the over-center position. The other set of coupling interlock switches 56–F, 57–F are arranged to operate in an analogous manner when the forward solenoid 53–F is energized to operate the coupling mechanism to reverse the drive connection from rewind to forward drive.

With the foregoing arrangement, the drive mechanism will drive the recording medium in forward direction whenever the contacts of forward relay 55–F are closed, provided the coupling mechanism is in the forward coupling position. Similarly, the driving mechanism will drive the recording medium in the rewind direction when ever the contacts of rewind relay 55–R are closed, provided the coupling mechanism is in the rewind coupling position indicated by the dash-dot line 4—35–R.

The circuits controlled by the forward drive relay 55–F and rewind relay 55–R serve also to control the energization of the motor 4—20 as well as the selective operation of the coupling reversing solenoids 53–F, 53–R, as a result the selective operation of the contacts of one or the other of the drive control relays 55–F, 55–R will also bring about a reversal of the coupling connections of one or the other of the relay contacts is actuated to the closed position for driving the recording medium in one direction while the coupling mechanism is in a position in which it establishes a driving connection in the other direction.

Thus, if the drive mechanism is in the condition shown in Fig. 1—in which the drive shaft of motor 4—20 is coupled to the drive shaft 4—13 of the take-up reel for driving it in forward direction—and the contacts of the rewind relay 55–R are actuated to the closed position, it will complete a circuit leading by way of the closed coupling interlock contacts 56–R to the solenoid 53–R bringing about its energization, provided the contacts of the time delay relay 61 are closed. Thereupon, the rewind solenoid 53–R will be operated to reverse the coupling connection from the position shown to the position corresponding to the rewind drive position indicated by the dash-dot line 4—35–R. When so actuated to the rewind position, the movement of the coupling mechanism automatically operates the interlock contacts 56–R, 57–R to successively energize the motor and de-energize the rewind solenoid 53–R as it reaches the rewind coupling position indicated by dash-dot line 4—35–R.

In other words, the circuit leading to the two selectively operating contacts of the forward drive relay 55–F and the rewind drive relay 55–R may be directly utilized for controlling the operation of the drive mechanism to start and stop the driving action in one or the other direction or to at any time reverse the driving motion, in which case, however, the operation of the time action means 61 delays the reversal of the driving connections until the mechanism has been first brought to a stop.

In the arrangement shown, the selective actuation of the forward drive relay 53–R, 53–F is controlled by the operation of the selector switch blades 40—4, 40—5 by bringing them from a standby position 3 to any one of the forward drive positions 1, 2 or to any one of the rewind positions 4, 5.

Thus, when the selector switch blade 40—5 is in any one of the forward drive positions 1, 2, as shown in Fig. 1, the two selector switch blades establish the following energizing circuit for the forward drive relay 55–F: From the selector contact blade 40—5, which is connected to one terminal of the relay supply source, through the winding of the forward drive relay 55–F, through the contacts of the forward limit switch 51–F to the normally closed contacts of the latch switch 53, and then through a common circuit portion leading to the contacts of contact positions 2, 4, 5 of the selector contact blade 40—4, as well as to the recording control switch 58 which is shown used to set the drive mechanism in motion for forward drive during a recording operation.

Thus, with the arrangement shown, the forward drive relay 55–F will be energized and operated whenever the contact blades 40—5, 40—4 are in the playback position 2 and also when they are in the recording position 1, in which case, however, the operation of the forward relay 55–F to start and stop the drive will be controlled by the push-button drive switch 58 which may be combined with the microphone 42 so that the person recording may stop the recording operation and start the recording operation as he transmits with the microphone the desired message. In an analogous manner, the rewind drive relay 55–R will be energized to operate its contacts and cause the recording medium to be rewound whenever the selector contact blades 40—4, 40—5 are in either positions 4 or 5.

It will be noted that when the selector switch 40 with its drive control blades is actuated from either one of positions 1, 2 to either one of positions 4, 5, or vice versa, contact blade 40—4, on reaching or moving past the standby position 3, applies a blocking potential to the control circuit of time delay relay 61, thereby instantaneously causing it to open its contacts and de-energize the operating circuits of both coupling solenoids. Because of the time delay action in reclosing its contacts, the time delay relay 61 will keep the energizing circuits of the coupling solenoids 53–F, 53–R de-energized for the time required in order to bring the motor to a stop, whenever the selector switch 40 has been actuated from either one of the forward drive positions 1, 2 to either one of the rewind positions 4, 5, or vice versa.

It will be noted that whenever the selector switch blade 40—4 is in the standby position 3 or is returned to the standby position 3 from any of the drive positions, it will apply a blocking potential to the control circuit of the time delay relay 61 and instantaneously release its contacts to its normally open position in which it blocks the operation of the coupling reversing solenoids 53–F, 53–R.

Instead of providing a separate drive control switch 58 for driving the medium in forward direction or for stopping it, the contact blade 40—4 of the selector switch may be utilized to control the forward drive operation during the recording process by interconnecting the contact of its contact position 1 with the interconnected contacts of contact positions 2, 4, 5. In such case, it is merely necessary to remove the connection of the ungrounded terminal of the sound reproducing device 45 which, in the arrangement shown in Fig. 1, is connected by selector contact blade 40—4 in position 1 to ground, so as to cut it off during the recording operation, this being merely an auxiliary operation which can be performed in many other ways by other simple instrumentalities.

The arrangement of the type described above makes it possible to discontinue at any time a recording or playback operation and start a rewinding operation by moving the selector switch from either one of positions 1, 2 to either one of positions 4, 5, in which case the rewind operation will be started after the time delay provided by the time action of the time action relay 61. In a similar way, a rewind operation may be discontinued at any time and changed over to a recording or playback operation by moving the selector switch from any one of positions 4, 5 to any one of positions 1, 2, in which case the forward drive will be started after the time delay provided by the time action relay 61 to assure that the recording medium and the reels have been first brought to a stop before starting to move in reverse direction.

It will be noted that with the drive mechanism in the forward drive position shown, actuation of the selector switch from the standby position to any one of the forward drive positions 1, 2 will start the forward drive at once, without any time delay. Similarly, in the event the drive coupling connection has been previously reversed to establish the rewind connections indicated by dash-dot line 4—35–R, a rewind operation will be started instantaneously without any time delay by merely moving the selector switch from the standby position to any one of the rewind positions 4, 5.

The contact blades of the selector switch 40, in addition to performing in their different operating positions the various functions described above, are also utilized to perform additional operations interlinked with their operations thus far described. Thus, in the recording position 1 of the selector switch, selector switch blade 40—3 applies the full positive potential to the oscillator 41 for energizing it to supply the erasing as well as the biasing currents, while at the same time the source of positive supply which is connected to this selector switch blade is also connected through a voltage reducing resistance 73 to the screen grid of a tube of the additional amplifier stage 43–A, thereby reducing the anode current drain of this amplifier stage without in any way impairing the operation of the principal amplifier 43 which serves to amplify the signal currents which are supplied to the recording head 38.

However, in the playback position 2 as well as in the rewind position 4, the selector switch blade 40—3 applies the full positive potential to the screen grid of the additional amplifier stage 43–A so that the auxiliary amplifier 43–A operates with full efficiency to amplify the recorded signals reproduced by the transducer head 38 now operating as a playback head to secure efficient reproduction of the record by reproducing device 45. In the arrangement shown, the record playback process is also carried on during the rewinding operation for playing back the recorded signal sequence in reverse direction. This is desirable in many applications, because with a little experience, a user of such recording device will be able to distinguish and recognize from the scrambled sequence of the recorded signals played back during a rewinding operation one or another part of the previously recorded message which he desires to play back. In such case, he has merely to stop the rewinding operation and actuate the selector switch 40 to play back the desired sequence. In order to provide for the playback operation during the rewinding process, selector switch blades 40—1, 40—2 complete in contact position 4 the same playback circuits which they established in position 2, as described above.

Furthermore, selector switch blade 40—1 applies a ground connection to the input side of the amplifier 43 when the selector switch is in the standby position or in the special rewinding position 5 which may be utilized for subjecting the recording medium to a special erasing operation, for instance, to erasure by a direct current supplied to the recording head, in which case the positive terminal of a suitable direct current source is connected to the contact element of contact position 5 of selector switch blade 40—2.

Instead of using time action means using electric circuit elements for determining the time delay, such as described above in connection with the time delay relay 61, other forms of time action means may be used. Thus, for instance, a spring driven member, such as an arm of a spring-driven clock work, may be used as the timing element for interposing a required time delay each time a drive control action is performed for reversing the direction of the drive forces applied to the recording medium or a drive control action which might be followed by an action which results in the reversal of the driving forces applied to the recording medium, so as to prevent reversal of the driving forces applied to the recording medium before the recording medium was first brought to a stop.

Such modified time action means may be combined with a relay, such as relay 61 shown in Fig. 1, so that the time action means operates to reclose the relay contacts with the required time delay, the relay contacts and the timing mechanism being combined so that whenever the relay winding is energized the contacts open instantaneously and at the same time cause the time action means to be charged for performing the desired timing action. Such time action relay means operating with a spring-driven timing mechanism are well known in the art and need not here be described. A relay 61 combined with such time action means may be controlled in the same manner as described above so that each time the selector switch is operated from a forward drive or rewind drive position to the standby position, the relay 61 is energized to instantaneously open its contacts, the contacts being reclosed under the control of the time action means with the required time delay for restoring the conditions under which a reversal of the driving connection or, in general, a reversal of the application of the driving forces to the recording medium may be accomplished.

Instead of using a contact blade of a selector switch, such as selector blade 40—4, for actuating the time action means to block a reversal of the driving connection each time the selector switch is actuated to reverse the driving connections, the time action means may be arranged to be operated each time the selector switch is moved from one control position to another control position for interposing a timed preventive action which prevents a reversal of the driving connection or, in general, a reversal of the driving forces applied to the recording medium until the end of the timing interval.

In Fig. 1–A is shown one form of such modified drive control arrangement in which conventional time action means are instantaneously actuated to the blocking condition in which it prevents the drive mechanism from completing a drive reversing operation during a predetermined time delay, whenever the drive control means such as selector switch 40, shown in Fig. 1, is actuated from any one of its operating to another operating condition. The rotary shaft of the selector switch 40 which carries the various contact blades 40—1 to 40—5 has also secured thereto an actuating member shown in the form of a cam sector 81 provided with a plurality of cam projections 82 arranged so that whenever the contact blades of the selector switch are moved from one position to the other, one or the other of the cam projections operates a suitably mounted switch 83. As indicated in Fig. 1–A, the switch 83 serves to control the operation of time action means to instantaneously disable the drive reversing mechanism for the duration of a predetermined timing interval required to assure that upon performing a drive reversing operation, the recording medium is brought to a stop before driving forces are applied thereto in opposite directions.

As explained above the time action means may be a mechanically timed mechanism which is indicated in Fig. 1–A as a dash-pot relay 61—1 arranged to instantaneously open its contacts 61—2 upon energization of the relay and to reclose its contact after a predetermined adjustably set timing period following the re-energization of the relay.

The contacts 61—2 of the time action relay 61—1 may be connected in the control circuit leading from one terminal of an electric power source to the two coupling solenoids 53–F, 53–R so that each time the time action relay 61—1 is energized, it instantaneously opens its contact 61—2 thereby disabling the coupling reversing mechanism for the period of the required timing interval.

Alternatively, the cam projections 82 of the drive control selector means 40 may be utilized for operating a mechanical latch member to interlockingly engage and lock a mechanical element of the coupling mechanism each time such drive control selector is actuated from one operating position to the other, the time action means permitting the return of the latch member to the coupling releasing position only after the lapse of the required timing interval.

Instead of using a rotary drive control selector means of the type indicated in Figs. 1 and 1–A, push-button type control selector means may be used for controlling the operation of the drive mechanism. Fig. 1–B shows a conventional type push-button mechanism which may be utilized for performing the control actions of a rotary selector of the type described in connection with Figs. 1 and 1–A. The selector mechanism of Fig. 1–B may be provided with five push rods, only two of which are indicated at 85—4, 85—5, for performing the control actions performed by the selector contact blades 40—4 and 40—5 of Fig. 1. The push rods 85—4, 85—5 are slidably guided in guide slits or holes of spaced mounting bars 86 which are joined by two cross bars 87 into a substantially rigid frame work. Each push rod is biased by a biasing spring 88 to the normal released position in which all rods—except rod 85—are held. Furthermore, each push rod is provided with a laterally projecting cam-like latch projection 89 and passes through a longitudinal slit 91 of a latch bar 90, slidably mounted in slits or holes of the cross bar 87 of the frame work so that when any one of the push rods is actuated from the released position to the operative position shown occupied by rod 85—5 the cam projection of the actuated push rod will laterally displace or shift the latch bar 90 to release all other push rods, such as push rod 85—5 which is in the latch position, the latch bar 90 being returned by its biasing spring 93 to the latching position shown, thereby locking the operated push rod in the operated position.

A selector control mechanism of the type shown in Fig. 1–B may be provided with several sets of switches 95 one for each push rod and arranged so that when a push rod is actuated to the operated position shown occupied by push rod 85—5, it will actuate its set of switches to the operative position. The sets of switches operated by the several push rods of Fig. 1–B may be utilized to perform the circuit control operations which are perforced in Fig. 1 by selector switch blades 40—1 to 40—5.

The selector mechanism of the type shown in Fig. 1–B is also shown provided with additional switch contacts 83—1 suitably supported on the frame work so that the switch 83—1 is operated by the lateral movement of the push rod 90 each time one or the other of the push buttons 85—1 to 85—5 is actuated to the operative position. The additional switch 83—1 may be utilized for controlling the time action means, such as relay 61—1, in the same manner as it is controlled by the switch contacts 83 of the control mechanism shown in Fig. 1-A, for disabling the drive reversing mechanism during a predetermined timing interval, each time the drive control means is actuated from one operating condition to another operating condition. The mechanical motion of the individual push rods of a selector mechanism of the type shown in Fig. 1-B may be utilized for mechanically controlling the drive or the coupling mechanism of the type described above in connection with Fig. 1 in which case the lateral movement of the latch bar 90 may be utilized to move a lock element into locking engagement with the central portion of the coupling lever 4—35, preventing it from performing a drive reversing operation each time the selector means has been actuated from one operating condition to another, the lock element being interconnected with time action means which automatically return it to the coupling release posision after a required time delay.

In Fig. 1-B each set of switches 95 is shown provided with releasable switch contacts 95—5 which are closed only for a short instance when the associated push rod is actuated and pushed inwardly to the operated position at the end of its inward stroke, the switch contacts 95—5 being released to the open position when the push rod is returned by the latch bar 90 at the level at which it holds the other switch contacts closed, in the manner shown in Fig. 1-B for the set of switches 95 of operated push rod 85—5. The releasable switch contacts 95—5 of the several sets of switches may be connected in parallel and used in lieu of the additional switch 83—1 for momentarily energizing the time action relay 61—1 each time one of the several push rods is operated to effect a drive control operation.

In Figs. 1-C to 1-E is shown a modified form of drive control arrangement of the general type described in connection with Fig. 1. It has a coupling mechanism similar to that of Fig. 1, a coupling lever 4—35 serves to establish forward-drive coupling connections in the full-line position shown, and is movable therefrom to the dash-dot line pisition 4—35-R, in which it establishes a rewind drive coupling connection during the rewinding operation. The coupling lever 4—35 is biased by a toggle arm 4—43 either to the forward-drive full line position or to the rewind drive dash-dot position 4—35-R in the manner described in connection with Fig. 1. However, instead of operating the coupling control lever 4—35 through by solenoids, it is operated manually by means of a control lever 111 pivotally mounted on a fixed pivot 112, and movable between the full line position shown—to which it is brought for actuating the coupling mechanism to the forward-drive coupling position—and the dash-dot line position 111-A to which it is brought for actuating the coupling mechanism to the rewind-drive coupling position.

As indicated in Figs. 1-C and 1-D, the control lever 111 is connected to a movable portion of the coupling lever 4—35 by an energy storing connector element, shown in the form of a spring 114, so that when the control lever 111 is moved from the full line position to the dash-dot position 111-A, the biasing spring 114 will be charged and tensioned so that it exerts a force sufficient to bring the coupling lever 4—35 from the forward drive full line position shown to the dash-dot line rewind-drive position 4—35-R. The connector spring 114 is similarly effective in returning the coupling lever 4—35 from the dash-dot rewind-drive position 4—35-R to the forward drive full line position shown when the control lever 111 is returned from the dash-dot line position 111-A to the full line position.

Means are also provided for retaining or locking the coupling control lever 111, and preventing a reversal of the driving forces applied to the recording medium, before first bringing the recording medium to a stop, either in the full line position shown to which it is brought for establishing the forward drive condition or the dash-dot line position 111-A to which it is brought for establishing the rewind-drive condition. The locking means are shown in the form of two locking projections 113 held suitably affixed in the manner indicated in Fig. 1-E along the path of movement of the handle arm lever 111, so that it may be moved past the interlocking projections 113. The portion of the control lever 111 is resiliently flexible so that it may be lifted from its position of locking engagement with a locking projection 113 and moved from one position to the other. The control arm of the control lever 111 being biased to establish locking engagement with a locking projection 113 when it is moved beyond it.

The drive control arrangement shown in Figs. 1-C and 1-E is also combined with time action means operative to prevent a reversal of the application of the driving forces to the recording medium before first stopping the recording medium. In the arrangement shown, there is provided to this end a blocking member 115 which is arranged to be moved into a position in which it blocks the movement of the coupling lever 4—35 from one coupling position to the other whenever the coupling control lever 111 is actuated from one control position to the other. The blocking element 114 is combined with time action means operative after the required time delay to retract blocking member 115 from the blocking position to a releasing position in which it permits the coupling lever 4—35 to perform a drive reversing operation under the control of the control lever 111.

In Figs. 1-C and 1-D, the blocking member 115 is shown held by one arm of a rocking member 116 pivotally mounted on a fixed pivot 117, and carrying on its other arm a cam member 118, shaped so that when the control lever 111 is moved from one control position to the other control position a portion thereof will engage the cam member 118 and actuate it to cause the rocker 116 to be rocked to a position in which its blocking member 117 blocks the movement of the coupling lever 4—35 from one position to the other.

As indicated in Figs. 1-C and 1-D, the rocker member 116 of the blocking mechanism is biased by a spring 121 to a releasing position in which the coupling lever 4—35 is free to be moved from one coupling position to the other. In addition, the rocker member has connected thereto time action means, shown in the form of a dash-pot 124, which permits the blocking member 117 to be returned from the blocking position to the coupling release position only after a time delay sufficient to assure that the motor is first brought to a stop, whereupon the coupling mechanism is released to reverse the coupling connection under the action of the biasing connector 114 of the coupling control mechanism.

The coupling-blocking rocker 116 is also utilized to open the motor energizing circuit each time the drive control mechanism is actuated to reverse the direction of the driving forces applied to the recording medium. In the arrangement shown, this is accomplished by providing a switch 126 connected in the circuit leading from the drive motor 4—20 of the recorder so that each time the drive reversal blocking mechanism is actuated to the blocking condition, the motor circuit is opened, the switch 126 being re-closed only after the blocking mechanism, such as shown in Figs. 1-C and 1-D, has been returned to its coupling-releasing position shown.

Fig. 1-F is a circuit diagram showing all electronically operated elements of a practical magnetic recorder designed for operation in accordance with the principles described above in connection with Fig. 1. In Fig. 1-F, the block indicated by dash lines 2—10 represents the drive unit of Fig. 1; the block indicated by dash lines 4—10 represents the elements of the drive mechanism of Fig. 1; and the other circuit parts including the circuit part indicated by the dash double dot line block 43-O, the amplifier and control circuits of the recorder. The recording amplifier 43-O has three amplifier stages associated with three amplifier tubes V-2, V-4, V-5. During the recording process, the tube circuit action of the amplifier leads from the plate or anode circuit of tube V-5 through the lead including resistor R-28 to a contact position 1 of contact blade 40—2 of the selector switch, in the manner analogous to that indicated diagrammatically in Fig. 1. The amplifier stage associated with tube V-7 corresponds to the amplifier stage 43-A shown in Fig. 1 and serves to provide the output required for playing back recorded signals with the reproducing device 45 or with the earphones which may be interconnected in the output circuit of tube V-7 by means of a jack J-4. The D. C. plate current of proper voltage is supplied to the amplifier circuits by a power supply circuit including a transformer T-4 and a two phase rectifier circuit including tube V-11.

The electrical wiring of the recorder is divided into several sections, namely, a wiring section shown in Fig. 1-F, enclosed by the dash-line block 4—10 of the drive and drive control mechanism, and a wiring section including the circuit interconnection between the elements of the recorder other than those of the reel holder unit 2—10 shown in Fig. 1-F. The wiring section of the drive mechanism 4—10 is connected to the wiring section of the amplifier through cooperating plug and socket members 4—80, 4—81 in which are insulatingly mounted sets of cooperating contact elements shown marked by numerals 1 to 18, respectively, which automatically establish a circuit interconnection when the plug and socket members are brought into contact engagement.

In order to supply electric energy to the various elements of the recorder, the drive unit 4—10 is provided with a conventional power supply cord provided with a conventional terminal plug 100-T which is arranged to be plugged into a standard 110-volt A. C. low voltage power supply socket. The electric supply conductors connected to the plug-in terminal 100-T lead through the wiring section of the drive unit 4—10 to the primary winding of the transformer T-4 of the amplifier power supply, the circuit to the transformer including a power supply switch 100-S and fuses 100-F.

As indicated in Fig. 1-F, the power supply transformer T-4 is provided with secondary windings for supplying heating current to the cathodes of the several tubes V-2, V-4, V-5, V-6, V-10, V-11 as well as for supplying heating current to the cathodes of the two amplifier tubes V-1, V-3 which form part of an oscillating circuit which serves as the source of oscillations indicated in Fig. 1 at 41. As indicated in Fig. 1-F, this secondary winding which supplies heating current to the cathodes is also utilized to supply energy to the three signal lamps, namely, the standby lamp I-1 which, when energized, indicates that the power is on; signal lamp I-2 which, when energized, indicates that the motor is energized and operates; and signal lamp I-3 which, when energized, gives a warning that the recording medium carrying on a recording or playback process is approaching a predetermined part of its end, for instance, the last five minutes of its total recording or playback length, this signal lamp being operated by the warning switch 52-W of the reel holder unit 2—10.

In order to carry on the magnetic recording process in a most effective way, it is important to assure that when carrying on a recording operation, the level of the signal delivered to the recording head is sufficiently high so as to make use of the available dynamic range of the magnetic recording medium without, however, introducing distortion by an excessive level of the signal. A conventional electron-ray tube indicator is a particularly desirable medium for indicating the level of the recorded signals, that is, of the recording current supplied to the recording head 38. In order to provide a level indication with an electron-ray tube indicator, its control electrode must be supplied with a D. C. voltage proportional to the signal, the level of which is to be indicated, and, in the past, a rectifier was generally used for deriving from the signal, the level of which is to be indicated, a D. C. voltage required to operate the electron-ray tube.

In accordance with the invention, the output amplifier tube which delivers the recording current, the level of which is to be indicated, is interconnected through a special circuit system with the electron-ray tube in such manner as to provide the desired D. C. control voltage without requiring a distinct rectifying unit, the rectification being supplied directly by the operation of the electron-ray tube. Fig. 1-F illustrates one form of such electron-ray tube indicator arrangement of the invention.

The output stage of the amplifier which delivers the recording signal utilizes a high impedance signal source, namely, in the arrangement shown, the high impedance pentode tube V-5 for delivering the recording current. However, the impedance presented by the coil or windings of the recording head 38 to the high impedance source formed by the pentode is such that the voltage developed across the coil windings of the recording head 38 differs in magnitude from the magnitude of the current delivered to the recording head.

According to the invention, novel circuit interconnections between a high impedance source of the recording current, such as presented by a pentode, and the voltage operated electron-ray tube with the current operated recording head, are arranged so as to derive a level indicating voltage component from the recording current source and at the same time maintain the relationship that the derived voltage component shall be proportional to the current delivered to the recording head. In the form of circuit arrangement shown, this objective is achieved by splitting the function of the pentode tube V–5 into two sub-functions.

The resistor elements R32, R33, R34 which are connected across the output side of the pentode or screen grid tube V–5 and are interconnected with the screen grid of the tube, are so chosen and proportioned that they present thereto a relatively small impedance so that the voltage developed across the resistance elements R32, R33 is proportional to the current through the tube V–5 without, however, degenerating its operation.

A component of the voltage so developed across the screen grid of tube V–5 is impressed on the control grid of the electron-ray tube V–6 through an input circuit including a series condenser C–22 and a shunt resistance R35 so proportioned that whenever the voltage applied to the control grid of electron-ray tube V–6 becomes positive with respect to its cathode, the tube shall act as a rectifier and cause current to flow through the tube into the condenser C–22. Furthermore, the condenser C–22 and the resistor R35 are of such values that the voltage developed across the resistance R35 and impressed on the control grid of electron-ray tube V–6 by the charge on the condenser C–22 does not diminish immediately to zero, but continues to be maintained by the current flow so as to exercise on the control grid of the electron-ray tube V–6 a control action corresponding to the magnitude of the plate current flowing in tube V–5.

In order to enable ready practice of this phase of the invention by those skilled in the art, and without in any way limiting the scope of the invention, there are given below data of one practical form of the combination of circuit elements required for securing the operation of an electron-ray indicator tube described above.

The pentode tube V–5—a 6SJ7 tube.
The electron-ray tube V–6—a 6E5 tube.
Cathode bias resistance R31—of 270 ohms.
Plate resistance R29—of 10,000 ohms.
Plate resistance R30—of 15,000 ohms.
Screen circuit resistance R32—of 3300 ohms.
Screen circuit resistance R33—of 3300 ohms.
Screen circuit resistance R34—of 3300 ohms.
Screen circuit resistance R35—of one megohm.
Control condenser C–22—of 100,000 m. m. f.

The circuit diagram of Fig. 1–F also discloses one form of a novel arrangement for providing a source of high frequency oscillations for supplying erasing current to the erasing head 37 and a high frequency A. C. bias component to the recording head in the manner described above in connection with Fig. 1 in which 41 indicates the source of high frequency oscillations.

As shown in Fig. 1–F, the elements which form the oscillation source generally indicated 41 include an oscillation generator formed by amplified tube V–1 and the circuit elements connected thereto, an amplifier of the generated oscillations formed by amplified tube V–3 and the circuit elements connected thereto.

Since the wave form of the high frequency biasing current component affects the character of the magnetic recording process, it is desirable to insure that the high frequency biasing currents are of substantially sinusoidal wave form. In the oscillator arrangement of the invention, high frequency oscillations of excellent wave shape are obtained by the coupling elements of the oscillator circuit associated with amplified tube V–1 from the non-linear reactive elements of the coil of the recording head 38. In the oscillator arrangement associated with the amplifier tube V–1, this is achieved in the manner described below.

The output side of the oscillator tube V–1 is connected to the control grid of the tube through a feedback circuit which includes only resistor and condenser elements arranged so as to form a phase shift network which shifts the phase of the output voltage 180° required to maintain the tube V–1 in an oscillating condition, the resistor and condenser elements of the phase shift network connected in the output circuit of tube V–1.

Furthermore, the resistor and condenser elements of the phase shift network are so disposed as to produce from the beginning to the end of the network a voltage of a progressively filtered and improved wave form of proper phase, which is impressed through feedback circuit connection including condenser C–6 and grid resistor R–1 to the control grid of oscillator tube V–1, thus assuring that the oscillations generated in the output circuit of this tube are of relatively pure sign wave voltage, which is impressed through a coupling circuit including the resistor R–5 on the control grid of the amplifier tube V–3, which operates in the capacity of a power amplifier and supplies the amplified oscillator output of pure wave form to the erasing head 37 and the recording head 38 in the required proportions In accordance with the invention, the purity of the high frequency oscillator currents supplied in the windings of the erasing head 37 and recording head 38 is further improved by providing in their circuit connections to the output side of the oscillator amplifier tube V–3 a condenser C–18 connected parallel to the coil of the recording head 38, the variations of which are so proportioned that they are resonant at the frequencies of the pure sign wave oscillations, and thus lowering their impedance at distortion frequencies. As a result, the coil windings of the erasing head 37 and the recording head 38 have the highest impedance at the frequency of the oscillations supplied by the oscillator, and they present an increasingly lower impedance at higher frequencies.

In order to enable ready practice of the invention by those skilled in the art, and without thereby limiting its scope, we are giving below data of one oscillator arrangement of the invention which was used successfully in practice.

Oscillator tube V–1—a 6SJ7 tube
Grid resistor R–1—1 megohm
Plate resistor R–5—75,000 ohms
Screen dropping resistor R–6—220,000 ohms
Phase shift resistors R–7, R–8, each—750 ohms
Screen by-pass condenser C–1—10,000 m. m. f.
Phase shift condensers C–2, C–3, C–5, each—240 m. m. f.
Feedback condenser C–6—10,000 m. m. f.
Amplifier tube V–3—a 6V6 tube
Grid resistor R–10—220,000 ohms
Cathode bias resistor R–13—330 ohms
Coupling condenser C–11—1000 m. m. f.
Condenser C–12—1000 m. m. f.
Condenser C–18—1000 m. m. f.

Winding of recording head 38—impedance of 300 ohms and Q of 2.6 at 1000 cycles; impedance of 2500 ohms and Q of 3.3 at 10,000 cycles, The circuit diagram of Fig. 1–F also discloses a novel electronic filter for the amplifier which is very desirable for the operation of recorders.

In the amplifier shown, the three amplifier tubes V–2, V–4, V–5 are arranged to operate as a high gain resistance coupled pentode amplifier. The additional amplifier stage of tube V–7 is likewise resistance coupled to the output side of tube V–5, and serves as an additional power amplifier stage during the playback process.

Wherever multi-stage amplifiers are used it is essential that cross-coupling between the amplifier stages shall be impossible or difficult. This problem is generally solved by using de-coupling sections which introduce sufficient impedance between successive amplifier stages so that cross-coupling becomes difficult. Such de-coupling sections require many de-coupling elements including condenser elements of large capacity values and this is generally undesirable.

Furthermore, in providing power supplies utilizing amplifier tubes for deriving from an A. C. power supply a regulated D. C. voltage substantially free from A. C. component, it has heretofore been the general practice to provide an element, such as a gaseous tube, which serves as a reference voltage element in supplying the desired regulating action.

In accordance with the invention, a D. C. power supply using an electronic filter for deriving from an A. C. source a D. C. operating voltage for a multi-stage amplifier is arranged to present a low D. C. source impedance to the associated amplifier, thereby eliminating the need for a D. C. reference voltage and providing a D. C. voltage which is free from short time voltage variations to a much higher degree than prior power supply using electronic filters.

As indicated in Fig. 1–F, the electronic filter circuit connected between the output side of the full wave rectifier tube V–11 and the D. C. supply line conductors 300 and 10–G includes an amplified tube V–9 connected to operate parallel to the D. C. supply line, and an additional amplifier tube V–10 connected to operate in series with the D. C. supply line 300. The circuits of the two amplifier tubes V–9 and V–10 are interconnected as two series stages of a cascaded amplifier with respect to any fluctuations in the D. C. output voltage. In the circuit arrangement shown this is accomplished in the manner described below.

Any variation in the voltage across the D. C. load presented by the amplifier is applied to the control grid of tube V–9 through a coupling condenser C–28. This voltage variation is reversed in phase and amplified by tube V–9, and is applied by the second coupling condenser C–27 to the control grid of the amplifier tube V–10 which is connected in series with the D. C. power supply line. Since the amplifier voltage variation has been reversed in phase from that originally appearing across the D. C. power supply, the series connected tube V–10, which is controlled by this phase reversed and amplied voltage, will exert a compensating action on the current drawn by the D. C. supply line through tube V–10 from the rectifier V–11, and this compensating action is magnified by the gain of the two tubes V–9, V–10 operating as cascaded amplifier stages. Because of the cascaded amplifier action a very small variation in the voltage across the D. C. load will exert a very strong compensating control action thereby making it possible to obtain a D. C. current supply of extremely great purity from A. C. voltage variations.

Furthermore, the electronic filter circuit shown is so arranged as to eliminate phase shift in its amplifier elements which might reduce the effectivness of the compensating control, and also by reducing to a minimum the number of circuit elements.

As shown in Fig. 1–F, to provide the bias for the series connected amplifier tube V–10 a part of the drop in the low resistance R–52 and R–53 of amplifier tube V–9, which are connected parallel to the D. C. load, is applied through resistance R–54 to the control grid of tube V–10; to provide the bias for the parallel connected amplified tube V–9 a part of the drop in the resistor elements R–55 and R–56, which are connected in series with the D. C. power supply, is applied to the control grid of the parallel operating amplified tube V–9. By deriving the bias voltages of the two electronic filter amplifier tubes connected in parallel and series with the load from the voltage divider action of a set of parallel connected resistor elements and a set of series connected resistor elements it is possible to exercise in the circuit a degree of D. C. voltage regulation without in the least degenerating or reducing the alternating voltage control.

The circuit arrangement shown provides also for an additional amount of D. C. regulation which will be now described. Thus, a change in the D. C. current through the series resistors R–55, R–57 applies to the control grid of tube V–9 a bias which produces in it a change in the plate current of such character as to supply in turn to the control grid of tube V–10 a bias voltage which produces the opposite effect, thus counteracting any changes in the D. C. current.

A D. C. power supply arrangement of the type described above, in connection with Fig. 1–F, provides a high degree of A. C. voltage control which is almost perfect in suppressing A. C. voltage variations, while at the same time providing an amount of D. C. voltage regulation which is sufficient for application, such as amplifiers used in recording systems, through the D. C. regulation is not as large as that provided in properly designed prior art in electronic filter D. C. power supplies.

A D. C. power supply with an electronic filter of the type described above, in connection with Fig. 1–F, when viewed from the amplifier, constitutes an A. C. impedance of such low value that it substantially eliminates any intercoupling effect between the amplifier stages without requiring the introduction of de-coupling sections in the amplifier stages. In other words, in a D. C. power supply provided with an electronic filter of the invention of the type described above, any A. C. voltage variations that may be impressed on the D. C. supply connections to the amplifier will be suppressed because the extremely low impedance of the power supply to such A. C. voltage variations, while at the same time suppressing hum and operating with an extremely small amount of circuit elements.

In order to enable ready practice of the invention by those skilled in the art, and without in any way limiting its scope, there are given below data of one practical form of power supply of the type described above which was successful in actual use.

Parallel amplifier tube V–9—a 6SJ7 tube
Series amplifier tube V–10—a 6V6 tube

Screen dropping resistance R–51—of 75,000 ohms
Screen return resistance R–59—of 47,000 ohms
Plate resistance R–52—of 5,100 ohms
Plate resistance R–53—of 100,000 ohms
Grid bias resistors R–55, R–57, each—of 47 ohms
Grid bias resistor R–54—220,000 ohms
Coupling condensers C–27, C–28, each—of 10,000 m. m. f.
Filter resistor R–58—of 10,000 ohms
Filter condensers C–29, C–30, each—4 m. f.

The magnetic recorder described above also embodies a number of additional operating elements shown diagrammatically in Fig. 1–F. The input jack J–2 is arranged to connect a plug leading from a microphone or radio to the input side of the amplifier during a recording process. Jack 31 provides for connecting the plug leading from a so-called "battle-announce" microphone to the input side of the amplifier during a recording process. A switch S–1 is shown connected in the input circuit to provide for proper gain for either radio or sound power recordings, the switch being placed in the low gain position when recording from a radio source. For sound power recording, a switch S–1 is placed in the high gain position.

The amplifier is also provided with means for equalizing the response. The combination of the capacitor C–10 and resistor R–20 in the plate circuit of amplified tube V–4 provides for an increase in gain in the low frequency end of the spectrum both in recording and play-back. In addition, when the selector switch 40 is in its playback position 2, the recording and reproducing head 33 is connected in parallel with the condenser C–9 to ground in order to boost the high frequency end of the frequency spectrum.

The recorder shown is designed to be efficient principally in recording speech. The equalization is limited to provide for essentially uniform response over a frequency range of 300 to approximately 3700 cycles per second.

The expression "magnetic record transducing" as used herein in the specification and claim is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claim it shall not be limited to the specific exemplifications of the invention described herein.

I claim:

In a magnetic record transducing apparatus: a long magnetic record member; transducer means in magnetic flux linkage relationship with said record member; two rotatably mounted reels for storing the said record member; means for driving said reels and said record member in forward and reverse directions; forward control means for controlling said driving means to cause said reels and said record member to be driven in the forward direction; reverse control means for controlling said driving means to cause said reels and record member to be driven in the reverse direction; interlocking means interlocking said forward control means with said reverse control means; first and second brake means, one for each of said two reels, for braking only the reel supplying the record member to the takeup reel; three-position switch means having forward and reverse positions with an intermediate condition inbetween; electrical time delay means connected to said switch means and connected to said interlocking means and connected to said forward and reverse control means to block the application of reverse driving forces to the supply reel when said reels are moving in the forward direction and to block the application of forward driving forces to the takeup reel when said reels are moving in the reverse direction, said blocking actions being removed immediately upon said reels coming to a complete stop.

THOMAS E. LYNCH.

REFERENCES CITED

The following references are of record in the file of this patent:

UNITED STATES PATENTS

| Number | Name | Date |
|---|---|---|
| 789,336 | Poulsen et al. | May 10, 1905 |
| 1,237,496 | Fankhauser | Aug. 21, 1917 |
| 1,552,321 | Lea | Sept. 1, 1925 |
| 1,592,613 | Meyer | July 13, 1926 |
| 1,634,979 | Carter | July 5, 1927 |
| 1,971,028 | Bothe | Aug. 21, 1934 |
| 2,051,787 | Foster | Aug. 18, 1936 |
| 2,231,365 | Matthews | Feb. 11, 1941 |
| 2,263,932 | Schnoll | Nov. 25, 1941 |
| 2,299,942 | Trevor | Oct. 27, 1942 |
| 2,300,632 | Poch | Nov. 3, 1942 |
| 2,351,008 | Camras | June 13, 1944 |
| 2,351,009 | Camras | June 13, 1944 |

FOREIGN PATENTS

| Number | Country | Date |
|---|---|---|
| 441,479 | Great Britain | Jan. 13, 1936 |